(12) United States Patent
Hafso

(10) Patent No.: US 12,435,688 B2
(45) Date of Patent: Oct. 7, 2025

(54) FUEL TRANSFER BYPASS TUBE AND SYSTEM

(71) Applicant: Ryan Eric Hafso, Camrose (CA)

(72) Inventor: Ryan Eric Hafso, Camrose (CA)

(73) Assignee: Ryan Eric Hafso, Alberta (CA)

( * ) Notice: Subject to any disclaimer, the term of this patent is extended or adjusted under 35 U.S.C. 154(b) by 0 days.

(21) Appl. No.: 18/501,249

(22) Filed: Nov. 3, 2023

(65) Prior Publication Data

US 2025/0146460 A1    May 8, 2025

(51) Int. Cl.
*F02M 37/00*    (2006.01)
*F02M 21/00*    (2006.01)

(52) U.S. Cl.
CPC ........ *F02M 37/0017* (2013.01); *F02M 21/00* (2013.01)

(58) Field of Classification Search
CPC ............................ F02M 37/0017; F02M 21/00
See application file for complete search history.

(56) References Cited

U.S. PATENT DOCUMENTS

| | | | |
|---|---|---|---|
| 4,740,140 A | 4/1988 | Benson | |
| 5,878,718 A | 3/1999 | Rembold et al. | |
| 6,027,360 A * | 2/2000 | Jenkins | H01R 13/6215 439/364 |
| 6,086,348 A | 7/2000 | Nothdurft et al. | |
| 7,007,675 B2 | 3/2006 | Ida et al. | |
| 7,097,433 B2 | 8/2006 | Struthers et al. | |
| 7,343,901 B2 | 3/2008 | Mori et al. | |
| 8,833,343 B2 | 9/2014 | Pursifull et al. | |
| 9,777,682 B2 * | 10/2017 | Preston | F02M 37/10 |
| 11,022,123 B2 | 6/2021 | Schaafsma | |

FOREIGN PATENT DOCUMENTS

CA    2440448 C    9/2008
RU    2739106 C1    12/2020

* cited by examiner

*Primary Examiner* — Lindsay M Low
*Assistant Examiner* — Charles J Brauch
(74) *Attorney, Agent, or Firm* — Argus Intellectual Enterprise, LLC; Daniel Enea; Jordan Sworen

(57) ABSTRACT

A fuel transfer bypass tube and system are provided. The fuel transfer bypass system utilizes a fuel bypass tube and a fuel supply pump to provide fuel to an engine without requiring modification to the engine or preexisting system. The fuel transfer bypass system includes multiple fuel lines that draw fuel from a source to pass through a filter and the fuel bypass tube. The fuel bypass tube includes a single monolithic structure able to reliably transfer the fuel under pressure through an inlet port to an outlet port via a channel. The fuel is delivered to the engine through a line secured to the outlet port. Each inlet and outlet port on the bypass tube includes an annular channel that receives O-rings to form a fluid seal with the respective mounting system. The bypass pump draws electrical power from the engine through a connector and an adaptor without any additional modifications.

14 Claims, 4 Drawing Sheets

FUEL TRANSFER BYPASS TUBE AND SYSTEM

BACKGROUND OF THE INVENTION

The present invention relates to a fuel transfer bypass tube and system. More specifically, the fuel transfer bypass tube and system comprise a fuel transfer pump adapted to transfer fuel from a fuel source via a first fuel supply line. A second fuel supply line that fluidly connects the fuel transfer pump to a fuel transfer bypass tube; wherein the fuel transfer bypass tube comprises: a cylinder having an intake port at a first end and an output port at a second end; wherein the cylinder is formed from a single monolithic member; an electrical adaptor configured to connect with an original equipment manufacturer (OEM) engine harness to supply power to the fuel transfer pump.

Fuel transfer systems have been integral components in diesel engines, serving the vital function of transferring fuel from a source to the engine's injection system. However, OEM transfer systems have long been plagued by a multitude of issues that have posed significant challenges to end-users. The fuel transfer systems in larger engines provide a way to force fuel through the components of an engine to supply fuel to the main pump (injection pump) for operating the engine. By utilizing a bypass tube system and fuel delivery pump for specific functions, such as starting the engine and normal operational requirements, the bypass tube system can be adapted specifically for the corresponding function. These bypass pumps require bypass tubes and fuel lines to deliver the fuel from the fuel source to the pump and ultimately to the engine. However, OEM fuel supply pumps are prone to failure causing major damage to the engine's injection pumps, along with costly down time for the end user of this engine. When the OEM fuel transfer system fails, this causes the system to need replacement. Should the OEM fuel transfer system be replaced with OEM replacement parts, it is likely that the replacement OEM transfer system will fail again. Moreover, those replacement parts may not be available should the engine be in a location far from the original manufacturer, as is common for heavy equipment and vehicles.

In view of these developments, there exists a need for a fuel transfer bypass system that is compatible with the OEM fuel transfer system while having more reliability. The present invention addresses the challenges associated with replacing OEM fuel transfer systems with a compatible bypass system. The increased reliability is, in part, achieved by utilizing a monolithic bypass tube. An additional issue that arises by replacing the OEM transfer system involves supplying electrical power to the new replacement bypass system. The present invention utilizes the electrical power from the engine with a connector and/or adaptor as needed for compatibility with no modifications required.

In light of the devices disclosed in the known art, it is submitted that the present invention substantially diverges in design elements and methods from the known art and consequently it is clear that there is a need in the art for an improvement for fuel transfer bypass tube and system. In this regard the instant invention substantially fulfills these needs.

SUMMARY OF THE INVENTION

In view of the foregoing disadvantages inherent in the known types of fuel transfer systems. The present invention provides a new fuel transfer bypass tube and fuel supply system that replaces OEM fuel systems for the purpose of increased reliability and tuning.

It is an objective of the present invention to provide an embodiment of the fuel transfer bypass tube and system to enhance fuel transfer efficiency within the system, ensuring a consistent and reliable fuel supply to the engine.

It is yet another objective of the present invention to provide an embodiment of the fuel transfer bypass tube and system to seamlessly integrate the fuel transfer bypass tube into the existing OEM housing and components, simplifying installation, reducing the need for extensive engine modifications, and enhancing compatibility across various engine models.

It is yet another objective of the present invention to provide an embodiment of the fuel transfer bypass tube formed from a monolithic member that minimizes potential points of failure, improving durability, and ensuring consistent fuel flow for long-term system reliability.

It is an objective of the present invention to provide an embodiment of the fuel transfer bypass system to replace problematic fuel transfer pumps and ensure a reliable fuel supply to the engine's injection pumps. This innovative system eliminates the need for engine modifications, programming updates, or additional aftermarket wiring.

It is an objective of the present invention to provide an embodiment of the fuel transfer bypass system to be compatible with a variety of engines and engine parts, such as the Cummins QST30 Diesel Engines. Moreover, the bypass tubes and system utilize a supply pump that allows the system to operate seamlessly without alterations to the OEM engine systems.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
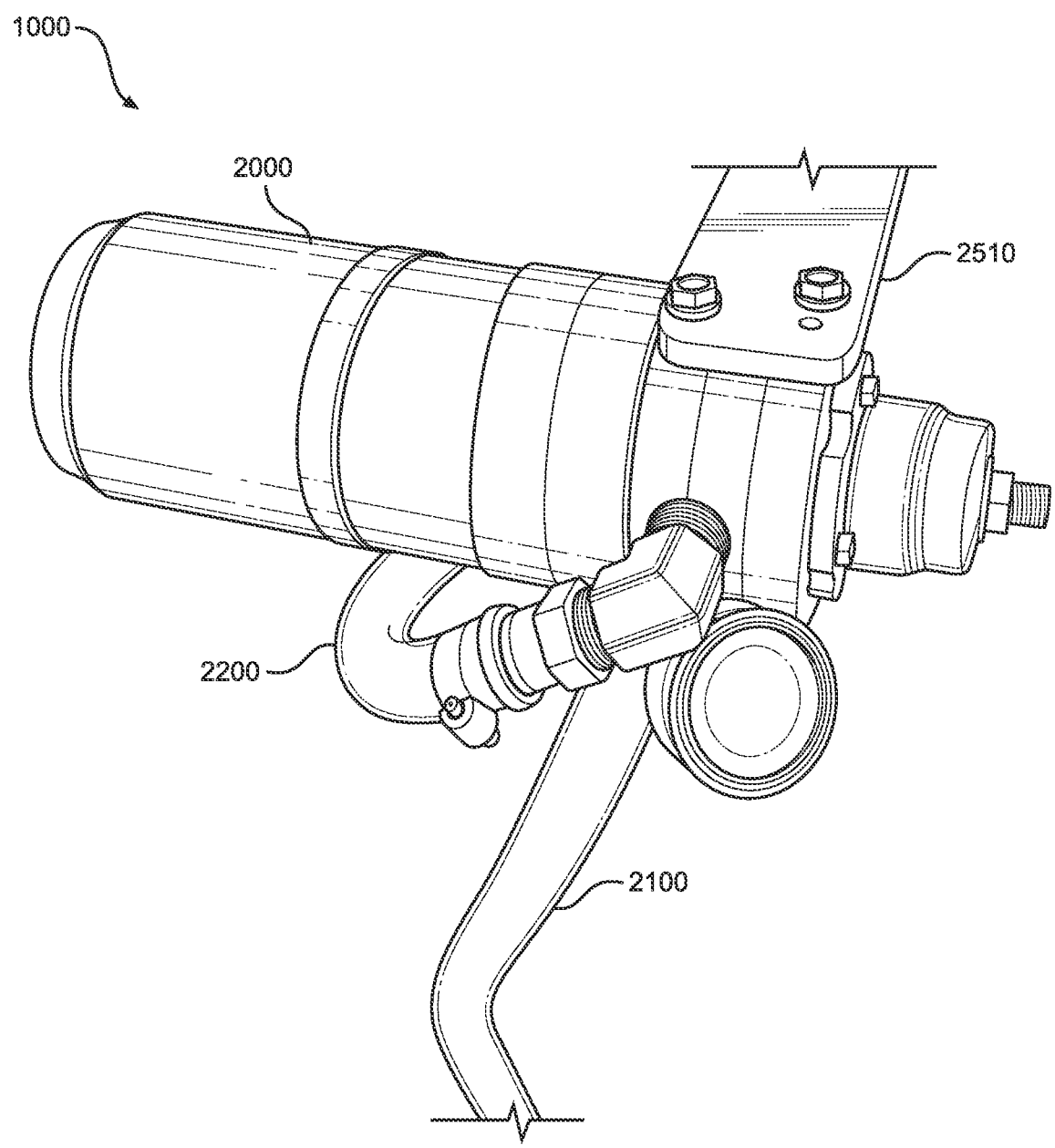
FIG. 1 shows a perspective view of an embodiment of the fuel transfer bypass pump system.

Reference is made herein to the attached drawings. Like reference numerals are used throughout the drawings to depict like or similar elements of the system. For the purpose of presenting a brief and clear description of the present invention, the embodiment discussed will be used for retrofitting and installing on a commercially available diesel engine, such as the Cummins QST30 Diesel Engine, with the bypass tubes positioned within the OEM housing and utilizing a fuel supply system pump. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment", "second embodiment", or "third embodiment" does not necessarily refer to the same embodiment.

Figure 2:
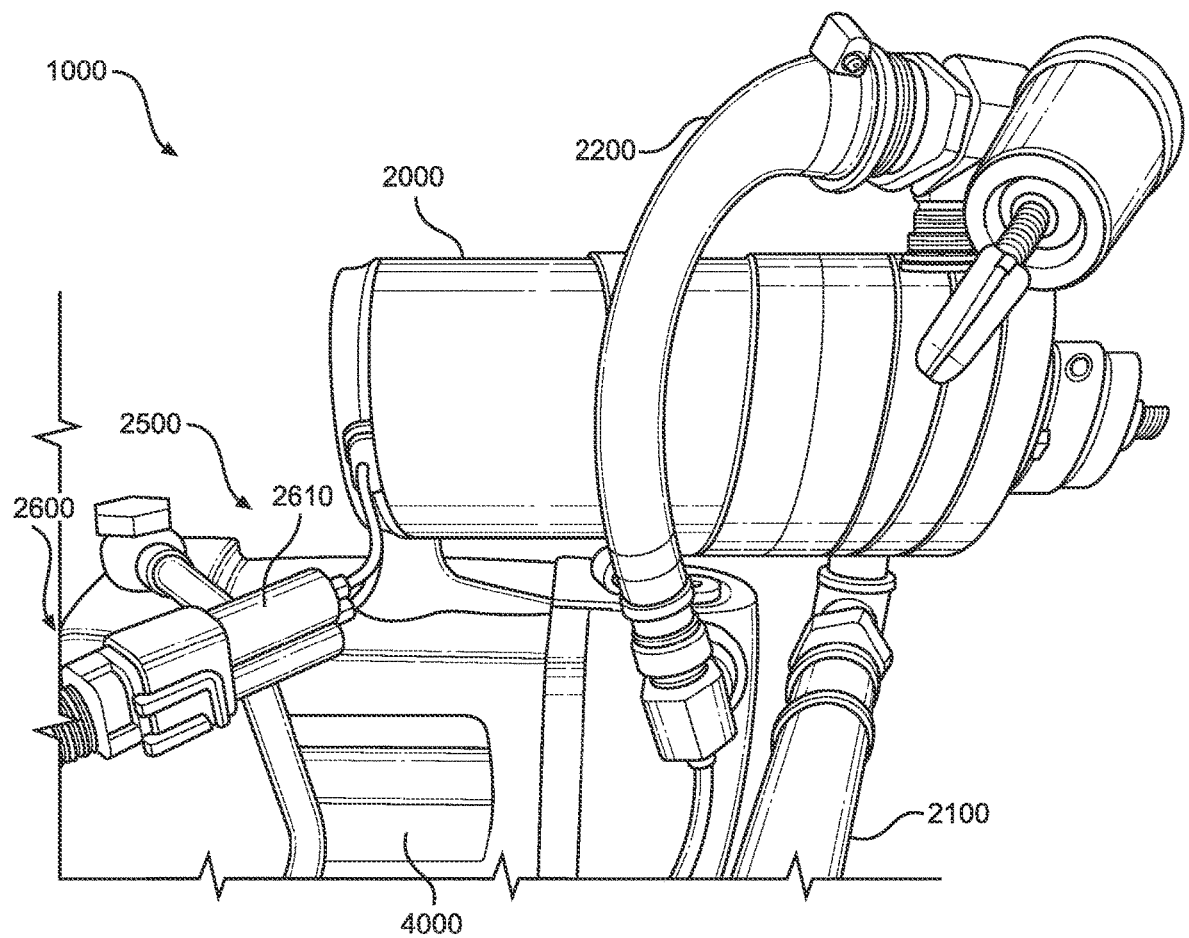
FIG. 2 shows an underside view of an embodiment of fuel transfer bypass system with a fuel transfer bypass tube.

Referring now to FIGS. 1 and 2, there is shown a perspective view of an embodiment of the fuel transfer bypass system and an underside view of an embodiment of fuel transfer bypass system with a fuel transfer bypass tube, respectively. The fuel transfer bypass system 1000 is adapted to replace transfer pumps in various engines to ensure delivery of the fuel supply to the injection pumps of the engine. The fuel transfer bypass system 1000 utilizes high strength fuel transfer bypass tubes 4000 with an external pump 2000 to increase the reliability of this aspect of the engine. The fuel transfer bypass system 1000 comprises a fuel transfer pump 2000 adapted to transfer fuel from a fuel source via a first fuel supply line 2100. The fuel transfer pump 2000 is adapted to draw fuel from the fuel source, wherein in one embodiment the fuel source is a fuel tank. The fuel tank may be on-board with the vehicle or may be positioned in stationary tanks. A second fuel supply line 2200 fluidly connects the fuel transfer pump 2000 to the fuel transfer bypass tube 4000 through OEM housings. The fuel transfer bypass tube 4000 is in fluid connection to the fuel transfer pump 2000, wherein both are disposed in close proximity to each other. In the shown embodiment, the fuel transfer pump 2000 is mounted to the OEM housing 2500 via a bracket 2510 and the fuel transfer bypass tube 4000 is disposed within an OEM housing 2500.

Referring to shown in FIG. 2, the fuel transfer bypass tube 4000 is shown within the OEM housing 2500. The OEM housing 2500 comprises a container with a hollow interior that receives the original OEM fuel part, wherein the OEM fuel part comprises both a pump and tube within a single housing. In this way, the present invention utilizes a fuel transfer bypass tube 4000 that is separated from the bypass fuel pump 2000 for several purposes. First, the fuel transfer pump 2000 is easily accessible in this position and provides for the first and second fuel lines 2100, 2200 to be easily inspected and replaced as needed.

In one embodiment, the fuel transfer pump 2000 utilizes the OEM electrical harness 2600 via an adaptor to connect to the transfer pump connectors 2610. The fuel transfer pump 2000 requires an electrical power source to operate enabling it to draw in fuel, pressurize it, and ultimately deliver it to the engine. By utilizing the OEM electrical power, no additional electrical rewiring is required during the installation and use thereafter. Therefore, this does not require modifications to the engine. The system is configured to integrate with the OEM engine harness, thereby simplifying the overall installation process and ensuring compatibility with the existing electrical infrastructure of the engine. An "engine harness" refers to the intricate network of wires, connectors, and components that facilitate the electrical connections within the engine. The electrical system of the fuel transfer pump 2000 is equipped with an electrical adaptor, which is specifically configured to connect with the OEM engine harness.

Figure 3:
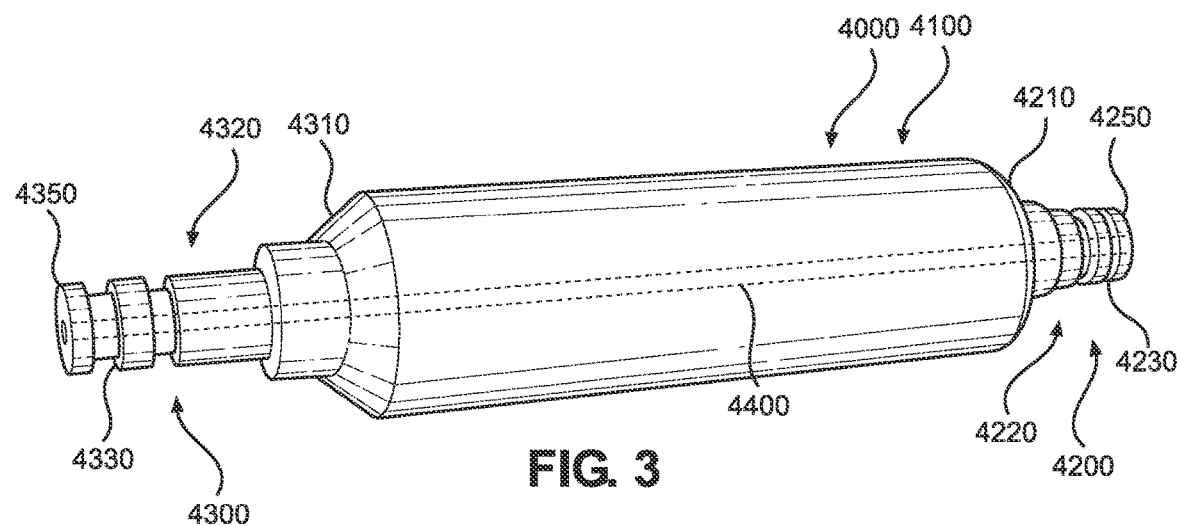
FIG. 3 shows a first perspective view of an embodiment of the fuel transfer bypass tube.
Figure 4:
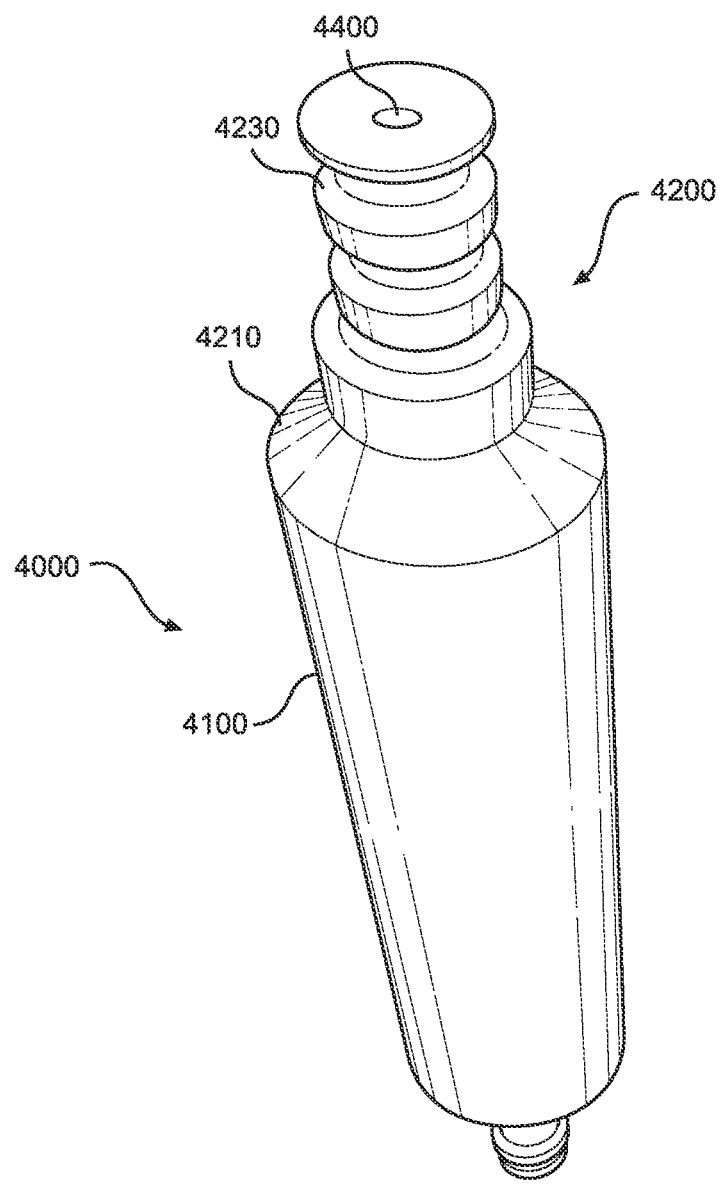
FIG. 4 shows a second perspective view of an embodiment of fuel transfer bypass tube.

Referring now to FIGS. 3 and 4, there is shown a first perspective view of an embodiment of the fuel transfer bypass tube. The fuel transfer bypass tube 4000 comprises a cylinder 4100 having an intake port 4200 at a first end 4250 and an output port 4300 at a second end 4350. The cylinder 4100 is formed from a single monolithic member that is adapted to provide fuel to flow from the intake port 4200 to the output port 4300. The fuel transfer bypass tube 4000 is machined with precision to ensure consistent flow through the cylinder. The fuel transfer pump drives the fluid through the tube 4000. In the shown embodiment, a longitudinal channel 4400 is shown that extends through the cylinder 4100 from the intake port 4200 to the output port 4300, wherein the longitudinal channel 4400 runs along a longitudinal axis of the cylinder 4100. In one embodiment, the longitudinal channel 4400 comprises a uniform thickness from the inlet port to the outlet port 4200, 4300. In an alternative embodiment, the longitudinal channel 4400 tapers or includes other cross-sectional shapes that affect the fluid dynamic of the fuel passing therethrough.

In one embodiment, the cylinder 4100 is made through subtractive manufacturing. Subtractive manufacturing, also known as subtractive machining or material removal manufacturing, is a manufacturing process that involves removing material from a solid workpiece to create a desired shape or product. In one embodiment, an aluminum cylinder is used as the tube and the elements of the fuel bypass tube 4000 are formed in the cylinder 4100. In this way, the fuel bypass tube 4000 does not form joints, welds, or other mechanical fasteners or openings that may result in failure of the part.

In the shown embodiment, the cylinder 4100 is symmetrical about the longitudinal axis and a vertical axis. The synthetic shape allows for installation of the fuel transfer bypass tube 4000 simple without requires a particular orientation of the cylinder 4100. The cylinder 4100 is configured to be interchangeable with the original engine manufacturer fuel tube/part.

In one embodiment, the inlet port and the outlet port 4200, 4300 each comprise a tapered shoulder 4210, 4310 having a male plug 4220, 4320 that extends outward along a longitudinal axis of the cylinder 4100. Moreover, the inlet port and the outlet port 4200, 4300 each comprises one or more annular channels 4230, 4330 sized to receive an O-ring therearound, wherein the O-ring is adapted to form a seal between the first line and the inlet port 4200 and the second tube and the outlet port 4300 in the in-use configuration, respectively.

In the shown embodiments, the fuel transfer pump 2000 and the fuel transfer bypass tube 4000 each comprise a longitudinal plane which is disposed parallel to a horizontal plane. In this way, both elements 2000, 4000 are coplanar. In this way, the horizontal orientation assists with the flow of fuel therethrough.

Figure 5:
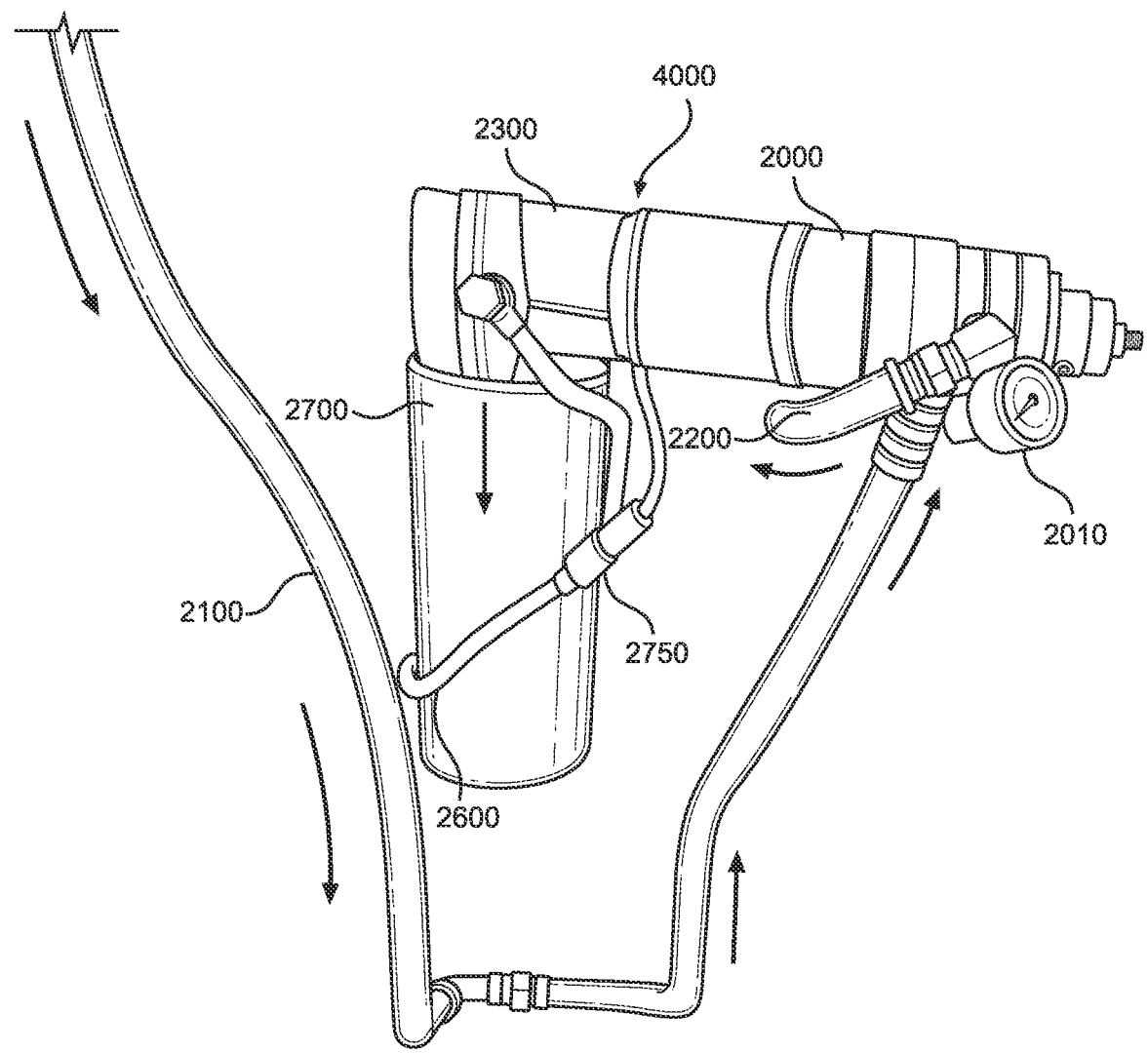
FIG. 5 shows an isolated perspective view of an embodiment of fuel transfer bypass system.

Referring now to FIG. 5, there is shown an isolated perspective view of an embodiment of fuel transfer bypass system. In the shown embodiment, the fuel flow path is shown from the fuel source through the fuel transfer pump 2000, the fuel transfer bypass tube 4000, and ultimately to the engine. In the shown embodiment, the fuel transfer process commences at the fuel tank, which is a reservoir containing the vehicle's or equipment's fuel supply. Within the fuel tank, or immediately adjacent to the fuel tank, there's typically a pickup tube or filter. The pickup tube is a slender, elongated tube designed to reach the bottom of the fuel tank, ensuring it can access the fuel even when the tank is not full. The filter screens out impurities and contaminants present in the fuel, preventing them from entering the fuel bypass pump 2000 and causing damage. In one embodiment, the filter is the OEM prefilter. The fuel bypass pump 2000 creates suction or negative pressure on this end of the pump 2000 and causes the fluid fuel to be picked up sent through the first fuel supply line 2100. Negative pressure refers to a pressure lower than atmospheric pressure, which encourages the flow of fluid into the pump 2000, allowing it to draw in the fuel efficiently. In some embodiments, the negative pressure is equal or greater than 25 psi. In other embodiments, the pressure is customizable, and the desirable pressure varies depending on the particular use case.

The first fuel supply line 2100 is drawn through the bypass pump 2000, where fuel travels to the second fuel supply line 2200. The second fuel supply line 2200 leads to the intake port of the fuel transfer bypass tube 4000, through the cylinder to the outlet port. In one embodiment, a manifold connects two fuel transfer bypass tubes 4000 in parallel to ensure that fuel flows even if one of the fuel transfer bypass tubes 4000 is blocked. In another embodiment, a single fuel transfer bypass tube 4000 is used. From the outlet port, a first fuel line 2300 feeds the fuel into an OEM filter 2700, which thus feeds a bank of injection pump(s) of the engine. In the shown embodiment, the first fuel line is within a housing and not visible. The first fuel line 2300 is similar to the first and second fuel supply lines 2100, 2200. As used herein, fuel line and fuel supply lines are similar, and each adapted to carry fuel.

In the shown embodiment, the OEM electrical harness 2600 is connected to the pump 2000 via the adaptor 2750. The pump 2000 comprises a pressure gauge 2010 configured to measure and display the pressure created by the pump. The pump 2000 can be configured to output a desired amount of pressure as desired by the user.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fuel transfer bypass tube configured to be interchangeable with an original engine manufacturer fuel tube for supplying fuel to an engine, comprising:
    a cylinder formed from a single monolithic member;
    the cylinder comprises an inlet port at an open first end and an outlet port at an open second end, wherein the open first end is in fluid communication with the open second end via a channel to transfer fuel toward the engine;
    wherein the inlet port is adapted to engage with an open end of a first line from a fuel source and the outlet port is adapted to engage with an open end of a second line leading to the engine in an in-use configuration;
    wherein the in-use configuration, a fuel is adapted to transfer from the first line through the cylinder to the second line to supply the engine.

2. The fuel transfer bypass tube of claim 1, wherein the cylinder is formed by subtractive manufacturing.

3. The fuel transfer bypass tube of claim 1, wherein the inlet port comprises a tapered shoulder having a male plug that extends outward along a longitudinal axis of the cylinder.

4. The fuel transfer bypass tube of claim 3, wherein the outlet port comprises a tapered shoulder having a male plug that extends outward along the longitudinal axis of the cylinder.

5. The fuel transfer bypass tube of claim 4, wherein the inlet port comprises one or more annular channels sized to receive an O-ring therearound, wherein the O-ring is adapted to form a seal between the first line and the inlet port in the in-use configuration.

6. The fuel transfer bypass tube of claim 5, wherein the outlet port comprises one or more annular channels sized to receive an O-ring therearound, wherein the O-ring is adapted to form a seal between the second line and the outlet port in the in-use configuration.

7. The fuel transfer bypass tube of claim 6, wherein the cylinder comprises a longitudinal channel that runs along a longitudinal axis of the cylinder.

8. The fuel transfer bypass tube of claim 7, wherein the longitudinal channel comprises a uniform thickness from the inlet port to the outlet port.

9. The fuel transfer bypass tube of claim 8, wherein the longitudinal channel is centrally positioned when viewed from a cross sectional view taken perpendicular to the longitudinal axis.

10. A fuel transfer bypass system, comprising:
    a fuel transfer pump adapted to transfer fuel from a fuel source via a first fuel supply line;
    a second fuel supply line that fluidly connects the fuel transfer pump to a fuel transfer bypass tube;
    wherein the fuel transfer bypass tube comprises:
        a cylinder having an intake port at a first end and an output port at a second end;
        wherein the cylinder is formed from a single monolithic member;
    an electrical adaptor configured to connect with an OEM engine harness to supply power to the fuel transfer pump.

11. A fuel transfer bypass system of claim 10, wherein the cylinder further comprises:
    an inlet port at an open first end and an outlet port at an open second end, wherein the open first end is in fluid communication with the open second end via a channel;
    wherein the inlet port is adapted to engage with an open end of the first line and the outlet port is adapted to engage with an open end of the second line in an in-use configuration;
    wherein the in-use configuration, a fuel is adapted to transfer from the first line through the cylinder to the second line.

12. A fuel transfer bypass system of claim 11, wherein the fuel transfer bypass tube is disposed within an OEM housing.

13. A fuel transfer bypass system of claim 11, wherein a prefilter may be positioned between the fuel source and the fuel pump.

14. The fuel transfer bypass tube of claim 1, wherein the fluid communication from the open first end to the open second end via the channel is substantially one-way.

* * * * *